(12) United States Patent
Noh et al.

(10) Patent No.: US 12,717,906 B2
(45) Date of Patent: Aug. 25, 2026

(54) MEMORY DEVICE FOR PREVENTING A ROW HAMMERING PHENOMENON

(71) Applicant: SK hynix Inc., Gyeonggi-do (KR)

(72) Inventors: Jun Seok Noh, Gyeonggi-do (KR); Sang Woo Yoon, Gyeonggi-do (KR); No Geun Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 202 days.

(21) Appl. No.: 18/621,106

(22) Filed: Mar. 29, 2024

(65) Prior Publication Data

US 2025/0139240 A1 May 1, 2025

(30) Foreign Application Priority Data

Oct. 31, 2023 (KR) ........................ 10-2023-0147711

(51) Int. Cl.
*G11C 11/406* (2006.01)
*G06F 21/55* (2013.01)

(52) U.S. Cl.
CPC .......... *G06F 21/554* (2013.01); *G11C 11/406* (2013.01)

(58) Field of Classification Search
CPC ............. G06F 21/554; G06F 2221/034; G11C 11/4076; G11C 11/406; G11C 11/408
See application file for complete search history.

(56) References Cited

U.S. PATENT DOCUMENTS

2002/0071327 A1* 6/2002 Kim ...................... G11C 11/406 365/222
2020/0211633 A1 7/2020 Okuma
2021/0375346 A1* 12/2021 Lim .................... G11C 11/4085
2021/0407570 A1* 12/2021 Lim .................... G11C 11/4076
2022/0189533 A1* 6/2022 Kim .................. G11C 11/40603
2022/0199148 A1* 6/2022 Hong .................. G11C 11/4091
2022/0230670 A1* 7/2022 Kim ...................... G11C 11/406
2022/0293161 A1* 9/2022 Cao ....................... G11C 11/408

* cited by examiner

*Primary Examiner* — Khamdan N. Alrobaie
(74) *Attorney, Agent, or Firm* — IP & T GROUP LLP

(57) ABSTRACT

Disclosed is a memory device including a count circuit suitable for: generating a plurality of group selection signals corresponding to a plurality of address groups by counting, in units of the address groups, a number of times that each of a plurality of address signals is inputted to the memory device, wherein each of the address groups corresponds to one or more address signals from the plurality of address signals, and selecting a target group from the address groups, the target group corresponding to a greatest one of the numbers for the respective address groups, and a sampling circuit suitable for randomly sampling a target address signal from the target group based on the plurality of group selection signals and the plurality of address signals.

19 Claims, 11 Drawing Sheets

223
RA<0:15>
INP
ACT
RALAT
DIV0
GF<0>
DIV1
GF<1>
DIV2
GF<2>
DIV3
GF<3>
GLAT0
GLAT1
GLAT2
GLAT3
TF0
TF1
TF2
TF3
SP
SLAT0
SLAT1
SLAT2
SLAT3
OUT0
TRR_SEL<0>
OUT1
TRR_SEL<1>
OUT2
TRR_SEL<2>
OUT3
TRR_SEL<3>
PLAT
TRR_RA<0:15>

FIG. 12

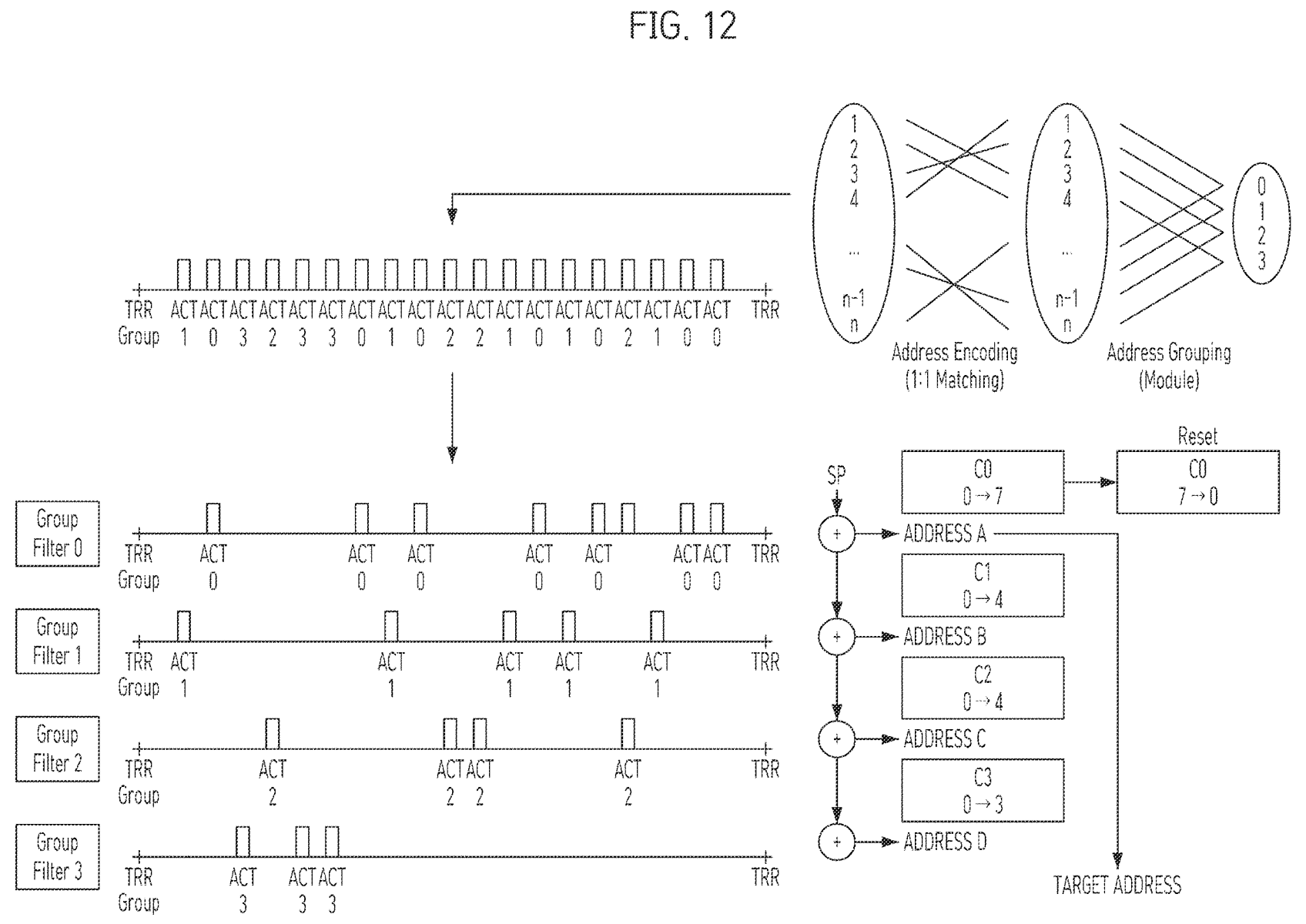

Address Encoding (1:1 Matching)

Address Grouping (Module)

Reset

C0 7→0

C0 0→7

C1 0→4

C2 0→4

C3 0→3

SP

ADDRESS A

ADDRESS B

ADDRESS C

ADDRESS D

TARGET ADDRESS

Group Filter 0

Group Filter 1

Group Filter 2

Group Filter 3

MEMORY DEVICE FOR PREVENTING A ROW HAMMERING PHENOMENON

CROSS-REFERENCE TO RELATED APPLICATION(S)

This application claims priority under 35 U.S.C. § 119 to Korean Patent Application No. 10-2023-0147711, filed on Oct. 31, 2023, the disclosure of which is incorporated herein by reference in its entirety.

BACKGROUND

1. Field

Various embodiments of the present disclosure relate to a semiconductor design technique, and more particularly, to a memory device that supports a target refresh operation.

2. Description of the Related Art

Each memory cell included in a memory device consists of a transistor that serves as a switch and a capacitor that stores charges (i.e., data). The memory device having such a structure performs a refresh operation to recharge data at predetermined periods in consideration of data loss due to leakage.

Meanwhile, as the degree of integration of the memory device increases, a gap between a plurality of word lines included in the memory device is decreasing. As the gap between the plurality of word lines decreases, a coupling effect between adjacent word lines is increasing.

Whenever data is inputted to or outputted from a memory cell, a word line toggles between an activated, i.e., an active state and a deactivated state. In this case, as a coupling effect between adjacent word lines increases, data in a memory cell connected to word lines adjacent to a frequently activated word line is damaged. Such a phenomenon is referred to as a row hammering phenomenon. When the row hammering phenomenon occurs, there is an issue in that data in the memory cell is damaged before the memory cell is refreshed.

FIG. 1, which is a diagram for describing the row hammering phenomenon, illustrates a portion of a memory cell array included in a memory device.

Referring to FIG. 1, a $K^{th}$ word line WLK corresponds to a word line with a high number of activations, and each of a $(K-1)^{th}$ word line WLK−1 and a $(K+1)^{th}$ word line WLK+1 corresponds to a word line disposed adjacent to the $K^{th}$ word line WLK. A $K^{th}$ memory cell CELL_K represents a memory cell connected to the $K^{th}$ word line WLK, a $(K-1)^{th}$ memory cell CELL_K−1 represents a memory cell connected to the $(K-1)^{th}$ word line WLK−1, and a $(K+1)^{th}$ memory cell CELL_K+1 represents a memory cell connected to the $(K+1)^{th}$ word line WLK+1. The memory cells include respective cell transistors TR_K, TR_K−1 and TR_K+1 and respective cell capacitors CAP_K, CAP_K−1 and CAP_K+1.

When the $K^{th}$ word line WLK toggles between an activated state and a deactivated state, voltages of the $(K-1)^{th}$ word line WLK−1 and the $(K+1)^{th}$ word line WLK+1 rise or fall due to a coupling phenomenon that occurs between the $K^{th}$ word line WLK and the $(K-1)^{th}$ word line WLK−1 and a coupling phenomenon that occurs between the $K^{th}$ word line WLK and the $(K+1)^{th}$ word line WLK+1, which affects the amount of charges of the memory cells CELL_K−1, CELL_K+1. Therefore, when the $K^{th}$ word line WLK frequently toggles between the activated state and the deactivated state, data in the $(K-1)^{th}$ memory cell CELL_K−1 and the $(K+1)^{th}$ memory cell CELL_K+1 may deteriorate.

In addition, electromagnetic waves that occur when a word line toggles between an activated state and a deactivated state cause electrons to flow into or out of a cell capacitor of a memory cell connected to a word line adjacent to the word line, thereby damaging data in the adjacent word line.

A method mainly used to solve this phenomenon, i.e., the row hammering phenomenon, in which data in memory cells connected to word lines (e.g., WLK+1 and WLK−1) adjacent to a specific word line (e.g., WLK) deteriorate when the specific word line is repeatedly activated a predetermined number of times or more is to additionally refresh the adjacent word lines (e.g., WLK+1, WLK−1) affected by the row hammering phenomenon, in addition to the performance of a general refresh operation, i.e., a normal refresh operation.

SUMMARY

Various embodiments of the present disclosure are directed to a memory device for preventing a row hammering phenomenon.

In accordance with an embodiment of the present disclosure, a memory device may include: a count circuit suitable for: generating a plurality of group selection signals corresponding to a plurality of address groups by counting, in units of the address groups, a number of times that each of a plurality of address signals is inputted to the memory device, wherein each of the address groups corresponds to one or more address signals from the plurality of address signals; and selecting a target group from the address groups, the target group corresponding to a greatest one of the numbers for the respective address groups; and a sampling circuit suitable for randomly sampling a target address signal from the target group based on the plurality of group selection signals and the plurality of address signals.

In accordance with an embodiment of the present disclosure, a memory device may include: a grouping circuit suitable for generating a plurality of group designation signals, which correspond to a plurality of address groups, based on a plurality of address signals, wherein each of the address groups corresponds to one or more address signals from the plurality of address signals; a group count circuit suitable for generating a plurality of group count signals, which correspond to the plurality of address groups, based on the plurality of group designation signals; a group selection circuit suitable for: generating a plurality of group selection signals based on the plurality of group count signals and a target refresh signal, and activating a group selection signal corresponding to a target group among the plurality of group selection signals; and a sampling circuit suitable for randomly sampling a target address signal from the target group based on the plurality of group selection signals and the plurality of address signals.

In accordance with an embodiment of the present disclosure, a memory device may include: a count circuit suitable for: generating a plurality of group selection signals corresponding to a plurality of address groups by counting, in units of the address groups, a number of times that each of a plurality of address signals is inputted to the memory device, wherein each of the address groups corresponds to one or more address signals from the plurality of address signals, and selecting a target group from the address groups, the target group corresponding to a greatest one of the numbers for the respective address groups; a sampling controller suitable for generating a sampling signal, which is randomly activated in a refresh period, based on a target refresh signal and an active signal; and a sampler suitable for randomly outputting, based on the sampling signal, the plurality of group selection signals and the plurality of address signals, a target address signal among the address signals included in the target group.

In accordance with an embodiment of the present disclosure, an operating method of a memory device, the method may include: selecting one from groups each including one or more memory regions, the selected group being accessed a greatest number of times from among the groups; and randomly selecting one from the memory regions included in the selected group to refresh one or more memory regions corresponding to the selected memory region, wherein the selecting includes identifying a number of times that address signals are provided to the memory device, the address signals being for accessing the memory regions included in each of the groups.

These and other features and advantages of the invention will become apparent from the detailed description of embodiments of the present disclosure and the following figures.

BRIEF DESCRIPTION OF THE DRAWINGS

FIGS. 12 and 13 are diagrams illustrating an operation of a memory device in accordance with an embodiment of the present disclosure.

DETAILED DESCRIPTION

Various embodiments of the present disclosure are described below with reference to the accompanying drawings, in order to describe in detail the embodiments of the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 2:
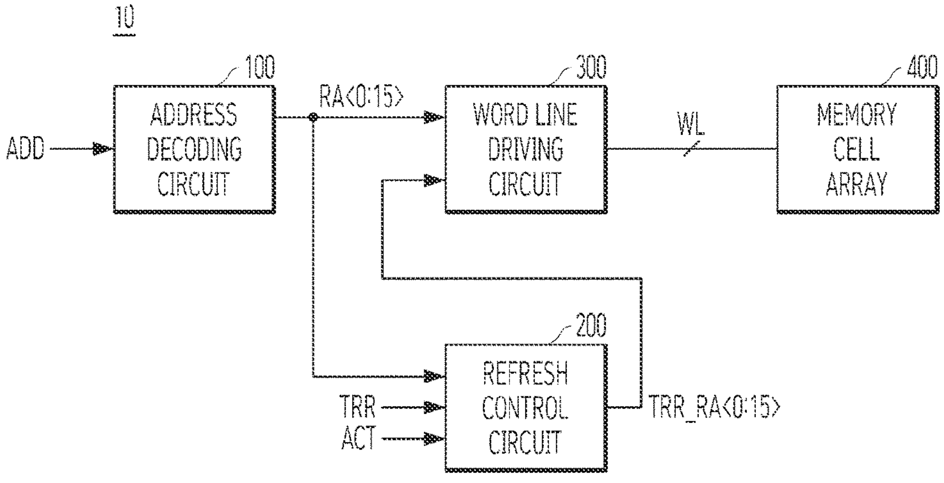
FIG. 2 is a block diagram illustrating a memory device in accordance with an embodiment of the present disclosure.

FIG. 2 is a block diagram illustrating a memory device 10 in accordance with an embodiment of the present disclosure.

Referring to FIG. 2, the memory device 10 may include an address decoding circuit 100, a refresh control circuit 200, a word line driving circuit 300, and a memory cell array 400.

Figure 1:
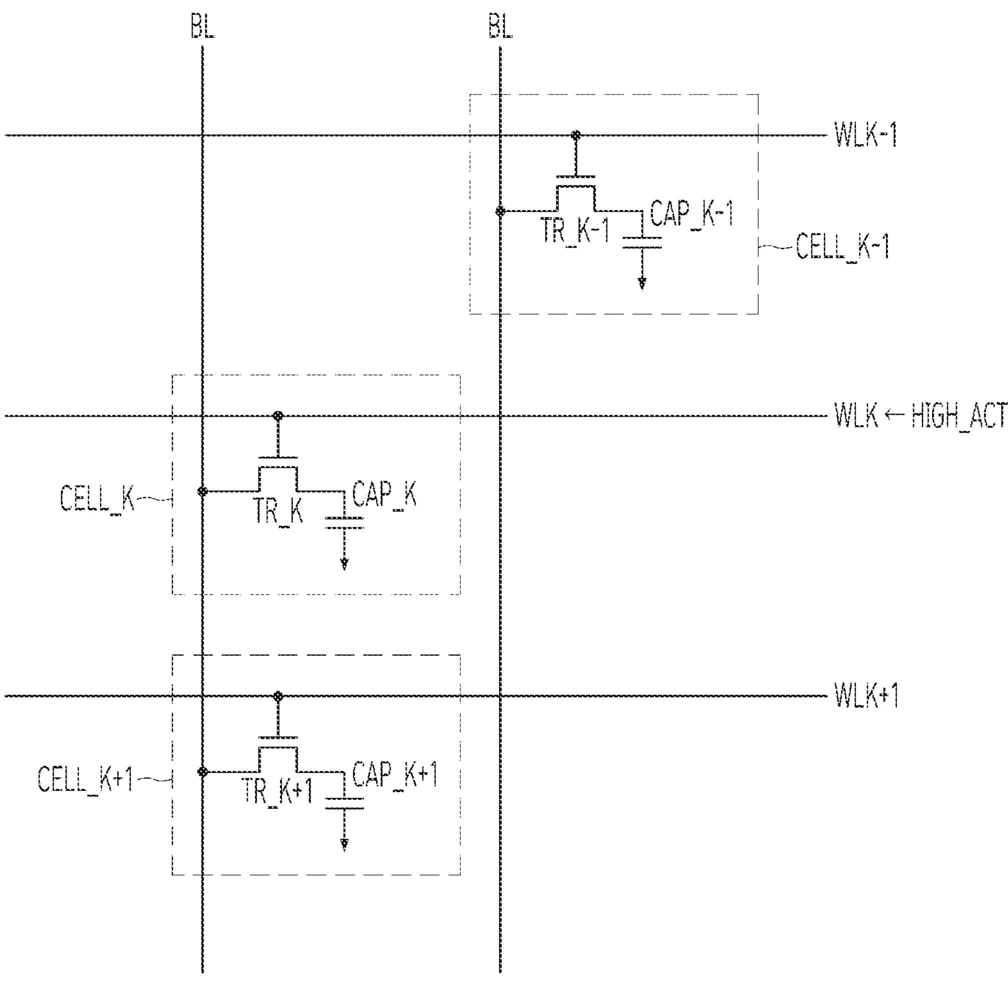
FIG. 1 is a diagram illustrating a portion of a memory cell array to describe a row hammering phenomenon.

The memory cell array 400 may include a plurality of memory cells, a plurality of bit lines, and a plurality of word lines WL (refer to FIG. 1).

The address decoding circuit 100 may generate a row address signal RA<0:15>, which corresponds to a word line selected from the plurality of word lines WL, on the basis of an address signal ADD. The address signal ADD may be an address signal currently inputted among a plurality of address signals corresponding to the plurality of word lines WL. For example, the address signal ADD may represent a logical address of the selected word line, and the row address signal RA<0:15> may represent a physical address of the selected word line.

The refresh control circuit 200 may generate a target address signal TRR_RA<0:15> required for a refresh operation of the memory cell array 400, on the basis of the row address signal RA<0:15>, a target refresh signal TRR and an active signal ACT. For example, the refresh operation may include a target refresh operation. The target refresh operation refers to an operation of additionally refreshing word lines adjacent to a specific word line in addition to a normal refresh operation, in order to solve the "row hammering phenomenon in which data in memory cells connected to the word lines adjacent to the specific word line deteriorate when the specific word line is repeatedly accessed, that is, driven, a predetermined number of times or more".

The word line driving circuit 300 may drive at least one word line among the plurality of word lines WL on the basis of the row address signal RA<0:15> and the target address signal TRR_RA<0:15>. For example, the word line driving circuit 300 may sequentially drive the plurality of word lines WL on the basis of the row address signal RA<0:15> during the normal refresh operation, and may sequentially drive a word line, which is randomly selected from the plurality of word lines WL, on the basis of the target address signal TRR_RA<0:15> during the target refresh operation.

Figure 3:
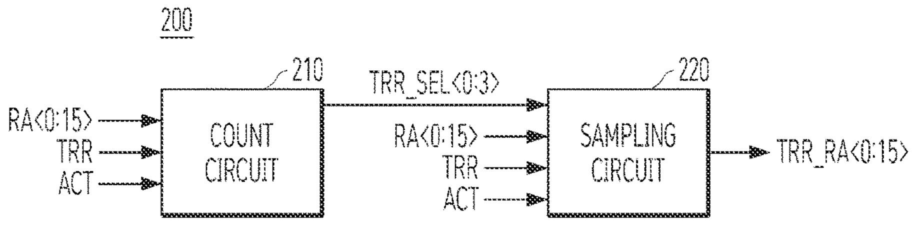
FIG. 3 is a block diagram illustrating a refresh control circuit illustrated in FIG. 2.

FIG. 3 is a block diagram illustrating the refresh control circuit 200 illustrated in FIG. 2.

Referring to FIG. 3, the refresh control circuit 200 may include a count circuit 210 and a sampling circuit 220.

The count circuit 210 may count, in units of address groups, the number of times that each of the plurality of address signals is inputted, on the basis of the row address signal RA<0:15>. Each of the address groups may correspond to one or more address signals among the plurality of address signals. The count circuit 210 may generate a plurality of group selection signals TRR_SEL<0:3> corresponding to the plurality of address groups, according to the count result. For example, the count circuit 210 may select, as a target group, an address group having the greatest number of the counted numbers for the respective address groups.

The sampling circuit 220 may randomly sample a target address signal TRR_RA<0:15> among address signals included in the target group, on the basis of the plurality of group selection signals TRR_SEL<0:3>, the row address signal RA<0:15>, the target refresh signal TRR, and the active signal ACT.

Figure 4:
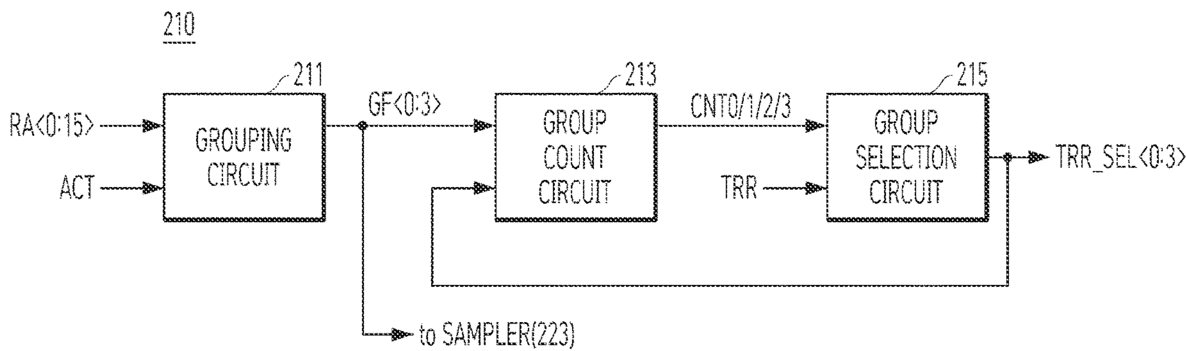
FIG. 4 is a block diagram illustrating a count circuit illustrated in FIG. 3.

FIG. 4 is a block diagram illustrating the count circuit 210 illustrated in FIG. 3.

Referring to FIG. 4, the count circuit 210 may include a grouping circuit 211, a group count circuit 213, and a group selection circuit 215.

The grouping circuit 211 may generate a plurality of group designation signals GF<0:3>, which correspond to the plurality of address groups, on the basis of the row address signal RA<0:15> and the active signal ACT. For example, the grouping circuit 211 may classify row address signals having the same low bits, i.e., RA<0:1>, among bits, i.e., 16 bits, included in the row address signal RA<0:15> into the same address group among the plurality of address groups (refer to FIG. 5).

The group count circuit 213 may generate a plurality of group count signals CNT0, CNT1, CNT2, and CNT3, which correspond to the plurality of address groups, on the basis of the plurality of group designation signals GF<0:3>. The group count circuit 213 may be initialized on the basis of the plurality of group selection signals TRR_SEL<0:3>.

The group selection circuit 215 may generate the plurality of group selection signals TRR_SEL<0:3> on the basis of the plurality of group count signals CNT0, CNT1, CNT2, and CNT3 and the target refresh signal TRR. The group selection circuit 215 may activate only a group selection signal corresponding to the target group among the plurality of group selection signals TRR_SEL<0:3>.

Figure 5:
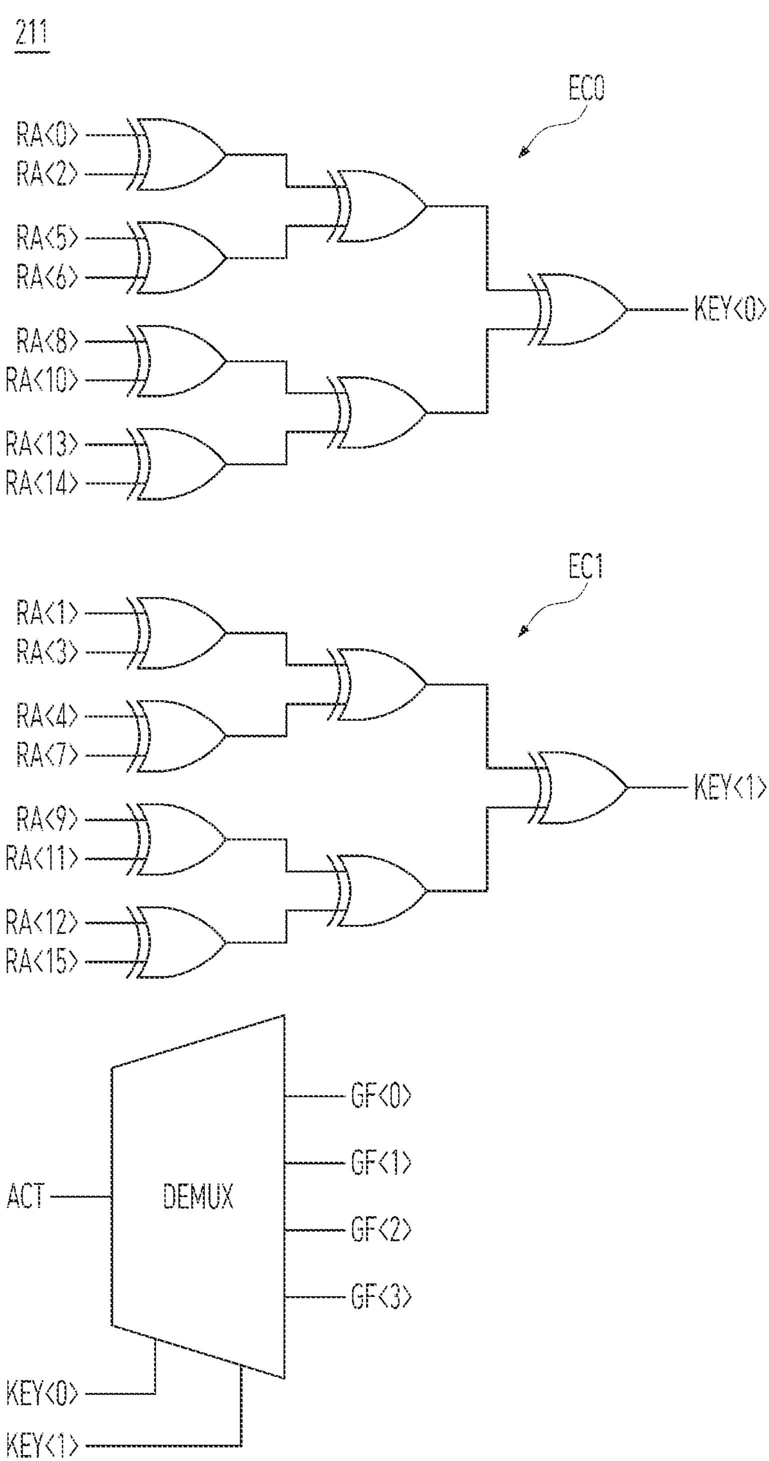
FIG. 5 is a circuit diagram illustrating a grouping circuit illustrated in FIG. 4.

FIG. 5 is a circuit diagram illustrating the grouping circuit 211 illustrated in FIG. 4.

Referring to FIG. 5, the grouping circuit 211 may include first and second encoders EC0 and EC1 and a demultiplexer DEMUX.

The first encoder EN0 may generate a first encoding signal KEY<0> on the basis of some bits RA<0>, RA<2>, RA<5>, RA<6>, RA<8>, RA<10>, RA<13> and RA<14> among the bits included in the row address signal RA<0:15>.

For example, the first encoder EN0 may include first to seventh exclusive OR gates. The first exclusive OR gate may perform an exclusive OR operation on the first and third bits RA<0> and RA<2>. The second exclusive OR gate may perform the exclusive OR operation on the sixth and seventh bits RA<5> and RA<6>. The third exclusive OR gate may perform the exclusive OR operation on the ninth and 11$^{th}$ bits RA<8> and RA<10>. The fourth exclusive OR gate may perform the exclusive OR operation on the 14$^{th}$ and 15$^{th}$ bits RA<13> and RA<14>. The fifth exclusive OR gate may perform the exclusive OR operation on output signals of the first and second exclusive OR gates. The sixth exclusive OR gate may perform the exclusive OR operation on output signals of the third and fourth exclusive OR gates. The seventh exclusive OR gate may generate the first encoding signal KEY<0> by performing the exclusive OR operation on output signals of the fifth and sixth exclusive OR gates.

The second encoder EN1 may generate a second encoding signal KEY<0> on the basis of the other bits RA<1>, RA<3>, RA<4>, RA<7>, RA<9>, RA<11>, RA<12> and RA<15> among the bits included in the row address signal RA<0:15>.

For example, the second encoder EN1 may include eighth to 14$^{th}$ exclusive OR gates. The eighth exclusive OR gate may perform the exclusive OR operation on the second and fourth bits RA<1> and RA<3>. The ninth exclusive OR gate may perform the exclusive OR operation on the fifth and eighth bits RA<4> and RA<7>. The 10th exclusive OR gate may perform the exclusive OR operation on the 10$^{th}$ and 12$^{th}$ bits RA<9> and RA<11>. The 11$^{th}$ exclusive OR gate may perform the exclusive OR operation on the 13$^{th}$ and 16$^{th}$ bits RA<12> and RA<15>. The 12$^{th}$ exclusive OR gate may perform the exclusive OR operation on output signals of the eighth and ninth exclusive OR gates. The 13$^{th}$ exclusive OR gate may perform the exclusive OR operation on output signals of the 10$^{th}$ and 11$^{th}$ exclusive OR gates. The 14$^{th}$ exclusive OR gate may generate the second encoding signal KEY<1> by performing the exclusive OR operation on output signals of the 12$^{th}$ and 13$^{th}$ exclusive OR gates.

As the first bit RA<0> is assigned to the first encoder EN0 and the second bit RA<1> is assigned to the second encoder EN1, the first and second encoding signals KEY<0:1> may represent the row address signals having the same low bits, i.e., RA<0:1>, among the bits, i.e., 16 bits, as the same address group. The demultiplexer DEMUX may generate the plurality of group designation signals GF<0:3>, which correspond to the first and second encoding signals KEY<0:1>, on the basis of the active signal ACT.

Although it is described as an example in the embodiment of the present disclosure that the first and second encoders EN0 and EN1 are included in the grouping circuit 211, the present disclosure is not necessarily limited thereto, and at least one encoder may be included depending on the number of bits of the row address signal RA<0:15> and/or the number of the plurality of address groups.

Figure 6:
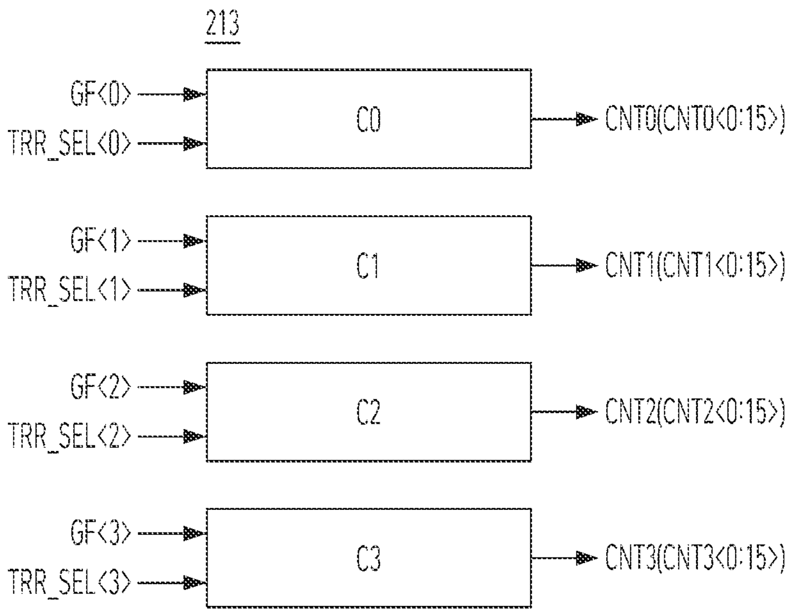
FIG. 6 is a block diagram illustrating a group count circuit illustrated in FIG. 4.

FIG. 6 is a block diagram illustrating the group count circuit 213 illustrated in FIG. 4.

Referring to FIG. 6, the group count circuit 213 may include first to fourth group counters C0, C1, C2, and C3.

The first group counter C0 may be selected based on the first group selection signal TRR_SEL<0> among the plurality of group selection signals TRR_SEL<0:3>. The first group counter C0 may generate the first group count signal CNT0 among the plurality of group count signals CNT0, CNT1, CNT2, and CNT3 on the basis of the first group designation signal GF<0> among the plurality of group designation signals GF<0:3>. For example, the first group counter C0 may count the number of activations of the first group designation signal GF<0>, and generate the first group count signal CNT0 corresponding to the count result. The first group counter C0 may be initialized based on the first group selection signal TRR_SEL<0> among the plurality of group selection signals TRR_SEL<0:3>. That is, the first group counter C0 may initialize the first group count signal CNT0 on the basis of the first group selection signal TRR_SEL<0>. The first group count signal CNT0 may include a plurality of bits CNT0<0:15>.

The second group counter C1 may be selected based on the second group selection signal TRR_SEL<1> among the plurality of group selection signals TRR_SEL<0:3>. The second group counter C1 may generate the second group count signal CNT1 among the plurality of group count signals CNT0, CNT1, CNT2, and CNT3 on the basis of the second group designation signal GF<1> among the plurality of group designation signals GF<0:3>. For example, the second group counter C1 may count the number of activations of the second group designation signal GF<1>, and generate the second group count signal CNT1 corresponding to the count result. The second group counter C1 may be initialized based on the second group selection signal TRR_SEL<1> among the plurality of group selection signals TRR_SEL<0:3>. That is, the second group counter C1 may initialize the second group count signal CNT1 on the basis of the second group selection signal TRR_SEL<1>. The second group count signal CNT1 may include a plurality of bits CNT1<0:15>.

The third group counter C2 may be selected based on the third group selection signal TRR_SEL<2> among the plurality of group selection signals TRR_SEL<0:3>. The third group counter C2 may generate the third group count signal CNT2 among the plurality of group count signals CNT0, CNT1, CNT2, and CNT3 on the basis of the third group designation signal GF<2> among the plurality of group designation signals GF<0:3>. For example, the third group counter C2 may count the number of activations of the third group designation signal GF<2>, and generate the third group count signal CNT2 corresponding to the count result. The third group counter C2 may be initialized based on the third group selection signal TRR_SEL<2> among the plurality of group selection signals TRR_SEL<0:3>. That is, the third group counter C2 may initialize the third group count signal CNT2 on the basis of the third group selection signal TRR_SEL<2>. The third group count signal CNT2 may include a plurality of bits CNT2<0:15>.

The fourth group counter C3 may be selected based on the fourth group selection signal TRR_SEL<3> among the plurality of group selection signals TRR_SEL<0:3>. The fourth group counter C3 may generate the fourth group count signal CNT3 among the plurality of group count signals CNT0, CNT1, CNT2, and CNT3 on the basis of the fourth group designation signal GF<3> among the plurality of group designation signals GF<0:3>. For example, the fourth group counter C3 may count the number of activations of the fourth group designation signal GF<3>, and generate the fourth group count signal CNT3 corresponding to the count result. The fourth group counter C3 may be initialized based on the fourth group selection signal TRR_SEL<3> among the plurality of group selection signals TRR_SEL<0:3>. That is, the fourth group counter C3 may initialize the fourth group count signal CNT3 on the basis of the fourth group selection signal TRR_SEL<3>. The fourth group count signal CNT3 may include a plurality of bits CNT3<0:15>.

Although it is described as an example in an embodiment of the present disclosure that the first to fourth group counters C0, C1, C2, and C3 are included in the group count circuit 213, the present disclosure is not necessarily limited thereto, and the number of group counters may be changed depending on the number of the plurality of address groups.

Since the first to fourth group counters C0, C1, C2, and C3 may be designed in the same manner, the first group counter C0 is representatively described below.

Figure 7:
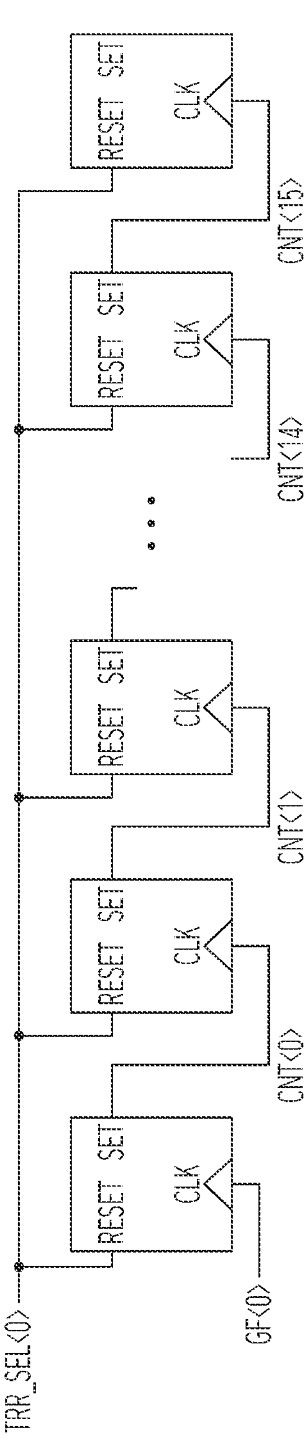
FIG. 7 is a block diagram illustrating a first group counter illustrated in FIG. 6.

FIG. 7 is a block diagram illustrating the first group counter C0 illustrated in FIG. 6.

Referring to FIG. 7, the first group counter C0 may include a plurality of count circuits. For example, the plurality of count circuits may include a first count circuit corresponding to the first group designation signal GF<0>, and second to $17^{th}$ count circuits respectively corresponding to first to $16^{th}$ bits CNT0<0:15> included in the first group count signal CNT0. The first group counter C0 may count the number of activations of the first group designation signal GF<0>, and generate the first group count signal CNT0 corresponding to the count result.

Figure 8:
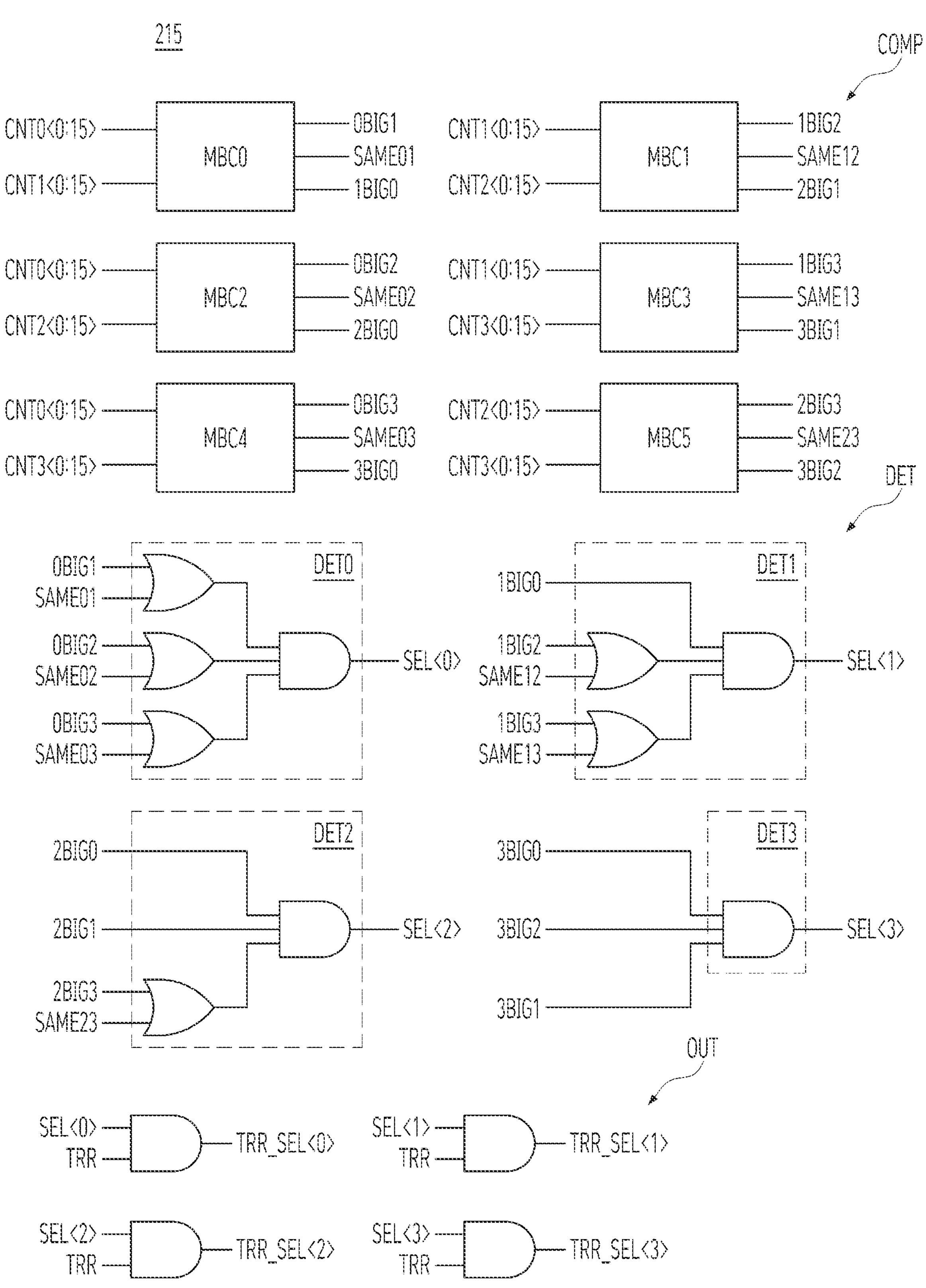
FIG. 8 is a block diagram illustrating a group selection circuit illustrated in FIG. 4.

FIG. 8 is a block diagram illustrating the group selection circuit 215 illustrated in FIG. 4.

Referring to FIG. 8, the group selection circuit 215 may include a discriminator COMP, a selector DET, and a generator OUT.

The discriminator COMP may determine a size relationship between the plurality of address groups on the basis of the plurality of group count signals CNT0, CNT1, CNT2, and CNT3, and generate a plurality of discrimination signals 0BIG1, SAME01, . . . , and 3BIG2 corresponding to the determination result. The discriminator COMP may include first to sixth comparators MBC0 to MBC5.

The first comparator MBC0 may compare the size relationship between first and second address groups among the plurality of address groups on the basis of the first and second group count signals CNT0 and CNT1, and generate first discrimination signals 0BIG1, SAME01, and 1BIG0 according to the comparison result. For example, when the comparison result indicates that the counted number for the first address group is greater than the counted number for the second address group, the first comparator MBC0 may activate the first signal 0BIG1 among the first discrimination signals 0BIG1, SAME01, and 1BIG0. When the comparison result indicates that the counted number for the second address group is greater than the counted number for the first address group, the first comparator MBC0 may activate the second signal 1BIG0 among the first discrimination signals 0BIG1, SAME01, and 1BIG0. When the comparison result indicates that the counted number for the first address group is equal to the counted number for the second address group, the first comparator MBC0 may activate the third signal SAME01 among the first discrimination signals 0BIG1, SAME01, and 1BIG0.

The second comparator MBC1 may compare the size relationship between the second address group and a third address group among the plurality of address groups on the basis of the second and third group count signals CNT1 and CNT2, and generate second discrimination signals 1BIG2, SAME12, and 2BIG1 according to the comparison result. For example, when the comparison result indicates that the counted number for the second address group is greater than the counted number for the third address group, the second comparator MBC1 may activate the fourth signal 1BIG2 among the second discrimination signals 1BIG2, SAME12, and 2BIG1. When the comparison result indicates that the counted number for the third address group is greater than the counted number for the second address group, the second comparator MBC1 may activate the fifth signal 2BIG1 among the second discrimination signals 1BIG2, SAME12, and 2BIG1. When the comparison result indicates that the counted number for the second address group is equal to the counted number for the third address group, the second comparator MBC1 may activate the sixth signal SAME12 among the second discrimination signals 1BIG2, SAME12, and 2BIG1.

The third comparator MBC2 may compare the size relationship between the first and third address groups among the plurality of address groups on the basis of the first and third group count signals CNT0 and CNT2, and generate third discrimination signals 0BIG2, SAME02, and 2BIG0 according to the comparison result. For example, when the comparison result indicates that the counted number for the first address group is greater than the counted number for the third address group, the third comparator MBC2 may activate the seventh signal 0BIG2 among the third discrimination signals 0BIG2, SAME02, and 2BIG0. When the comparison result indicates that the counted number for the third address group is greater than the counted number for the first address group, the third comparator MBC2 may activate the eighth signal 2BIG0 among the third discrimination signals 0BIG2, SAME02, and 2BIG0. When the comparison result indicates that the counted number for the first address group is equal to the counted number for the third address group, the third comparator MBC2 may activate the ninth signal SAME02 among the third discrimination signals 0BIG2, SAME02, and 2BIG0.

The fourth comparator MBC3 may compare the size relationship between the second address group and a fourth address group among the plurality of address groups on the basis of the second and fourth group count signals CNT1 and CNT3, and generate fourth discrimination signals 1BIG3, SAME13, and 3BIG1 according to the comparison result. For example, when the comparison result indicates that the counted number for the second address group is inputted is greater than the counted number for the fourth address group, the fourth comparator MBC3 may activate the $10^{th}$ signal 1BIG3 among the fourth discrimination signals 1BIG3, SAME13, and 3BIG1. When the comparison result indicates that the counted number for the fourth address group is greater than the counted number for the second address group, the fourth comparator MBC3 may activate the $11^{th}$ signal 3BIG1 among the fourth discrimination signals 1BIG3, SAME13, and 3BIG1. When the comparison result indicates that the counted number for the second address group is equal to the counted number for the fourth address group, the fourth comparator MBC3 may activate the $12^{th}$ signal SAME13 among the fourth discrimination signals 1BIG3, SAME13, and 3BIG1.

The fifth comparator MBC4 may compare the size relationship between the first and fourth address groups among the plurality of address groups on the basis of the first and fourth group count signals CNT0 and CNT3, and generate fifth discrimination signals 0BIG3, SAME03, and 3BIG0 according to the comparison result. For example, when the comparison result indicates that the counted number for the first address group is greater than the counted number for the fourth address group, the fifth comparator MBC4 may activate the $13^{th}$ signal 0BIG3 among the fifth discrimination signals 0BIG3, SAME03, and 3BIG0. When the comparison result indicates that the counted number for the fourth address group is greater than the counted number for the first address group, the fifth comparator MBC4 may activate the $14^{th}$ signal 3BIG0 among the fifth discrimination signals 0BIG3, SAME03, and 3BIG0. When the comparison result indicates that the counted number for the first address group is equal to the counted number for the fourth address group, the fifth comparator MBC4 may activate the $15^{th}$ signal SAME03 among the fifth discrimination signals 0BIG3, SAME03, and 3BIG0.

The sixth comparator MBC5 may compare the size relationship between the third and fourth address groups among the plurality of address groups on the basis of the third and fourth group count signals CNT2 and CNT3, and generate sixth discrimination signals 2BIG3, SAME23, and 3BIG2 according to the comparison result. For example, when the comparison result indicates that the counted number for the third address group is greater than the counted number for the fourth address group, the sixth comparator MBC5 may activate the $16^{th}$ signal 2BIG3 among the sixth discrimination signals 2BIG3, SAME23, and 3BIG2. When the comparison result indicates that the counted number for the fourth address group is greater than the counted number for the third address group, the sixth comparator MBC5 may activate the $17^{th}$ signal 3BIG2 among the sixth discrimination signals 2BIG3, SAME23, and 3BIG2. When the comparison result indicates that the counted number for the third address group is equal to the counted number for the fourth address group, the sixth comparator MBC5 may activate the $18^{th}$ signal SAME23 among the sixth discrimination signals 2BIG3, SAME23, and 3BIG2.

Although it is described as an example in an embodiment of the present disclosure that the first to sixth comparators MBC0 to MBC5 are included in the discriminator COMP, the present disclosure is not necessarily limited thereto, and the number of comparators may be changed depending on the number of the plurality of group count signals CNT0, CNT1, CNT2, and CNT3.

The selector DET may generate a plurality of selection signals SEL<0:3> to indicate the target group having the largest number of the counted numbers for the respective address groups, on the basis of the plurality of discrimination signals 0BIG1, SAME01, . . . , and 3BIG2. For example, the selector DET may include first to fourth analyzers DET0 to DET3.

The first analyzer DET0 may generate the first selection signal SEL<0> on the basis of the first signal 0BIG1, the third signal SAME01, the seventh signal 0BIG2, the ninth signal SAME02, the $13^{th}$ signal 0BIG3, and the $15^{th}$ signal SAME03. For example, the first analyzer DET0 may include first to third OR gates and a first AND gate. The first OR gate may perform an OR operation on the first signal 0BIG1 and the third signal SAME01. The second OR gate may perform the OR operation on the seventh signal 0BIG2 and the ninth signal SAME02. The third OR gate may perform the OR operation on the $13^{th}$ signal 0BIG3 and the $15^{th}$ signal SAME03. The first AND gate may generate the first selection signal SEL<0> by performing an AND operation on output signals of the first to third OR gates. The first selection signal SEL<0> may be activated when the counted number for the first address group among the first to fourth address groups is inputted is the largest.

The second analyzer DET1 may generate the second selection signal SEL<1> on the basis of the second signal 1BIG0, the fourth signal 1BIG2, the sixth signal SAME12, the $10^{th}$ signal 1BIG3, and the $12^{th}$ signal SAME13. For example, the second analyzer DET1 may include fourth and fifth OR gates and a second AND gate. The fourth OR gate may perform the OR operation on the fourth signal 1BIG2 and the sixth signal SAME12. The fifth OR gate may perform the OR operation on the $10^{th}$ signal 1BIG3 and the $12^{th}$ signal SAME13. The second AND gate may generate the second selection signal SEL<1> by performing the AND operation on the second signal 1BIG0 and output signals of the fourth and fifth OR gates. The second selection signal SEL<1> may be activated when the counted number for the second address group among the first to fourth address groups is inputted is the largest.

The third analyzer DET2 may generate the third selection signal SEL<2> on the basis of the eighth signal 2BIG0, the fifth signal 2BIG1, the $16^{th}$ signal 2BIG3, and the $18^{th}$ signal SAME23. For example, the third analyzer DET2 may include a sixth OR gate and a third AND gate. The sixth OR gate may perform the OR operation on the $16^{th}$ signal 2BIG3 and the $18^{th}$ signal SAME23. The third AND gate may generate the third selection signal SEL<2> by performing the AND operation on the eighth signal 2BIG0, the fifth signal 2BIG1 and an output signal of the sixth OR gate. The third selection signal SEL<2> may be activated when the counted number for the third address group among the first to fourth address groups is inputted is the largest.

The fourth analyzer DET3 may generate the fourth selection signal SEL<3> on the basis of the $14^{th}$ signal 3BIG0, the $17^{th}$ signal 3BIG2, and the $11^{th}$ signal 3BIG1. For example, the fourth analyzer DET3 may include a fourth AND gate. The fourth AND gate may generate the fourth selection signal SEL<3> by performing the AND operation on the $14^{th}$ signal 3BIG0, the $17^{th}$ signal 3BIG2, and the $11^{th}$ signal 3BIG1. The fourth selection signal SEL<3> may be activated when the counted number for the fourth address group among the first to fourth address groups is the largest.

The generator OUT may generate the plurality of group selection signals TRR_SEL<0:3> on the basis of the plurality of selection signals SEL<0:3> and the target refresh signal TRR. For example, the generator OUT may include fifth to eighth AND gates. The fifth AND gate may generate the first group selection signal TRR_SEL<0> by performing the AND operation on the first selection signal SEL<0> and the target refresh signal TRR. The sixth AND gate may generate the second group selection signal TRR_SEL<1> by performing the AND operation on the second selection signal SEL<1> and the target refresh signal TRR. The seventh AND gate may generate the third group selection signal TRR_SEL<2> by performing the AND operation on the third selection signal SEL<2> and the target refresh signal TRR. The eighth AND gate may generate the fourth group selection signal TRR_SEL<3> by performing the AND operation on the fourth selection signal SEL<3> and the target refresh signal TRR.

Figure 9:
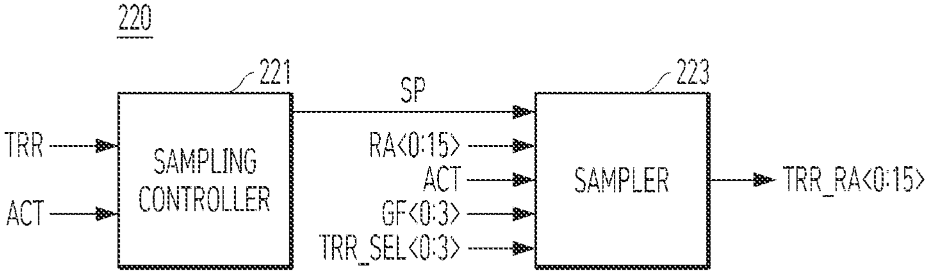
FIG. 9 is a block diagram illustrating a sampling circuit illustrated in FIG. 3.

FIG. 9 is a block diagram illustrating the sampling circuit 220 illustrated in FIG. 3.

Referring to FIG. 9, the sampling circuit 220 may include a sampling controller 221 and a sampler 223.

The sampling controller 221 may generate a sampling signal SP, which is randomly activated in a target refresh period, on the basis of the target refresh signal TRR and the active signal ACT. The target refresh period may be a period from a point in time when a current target refresh signal TRR is activated to a point in time just before a next target refresh signal TRR is activated.

The sampler 223 may randomly output the target address signal TRR_RA<0:15> among the address signals included in the target group, on the basis of the sampling signal SP, the row address signal RA<0:15>, the active signal ACT, the plurality of group designation signals GF<0:3>, and the plurality of group selection signals TRR_SEL<0:3>.

Figure 10:
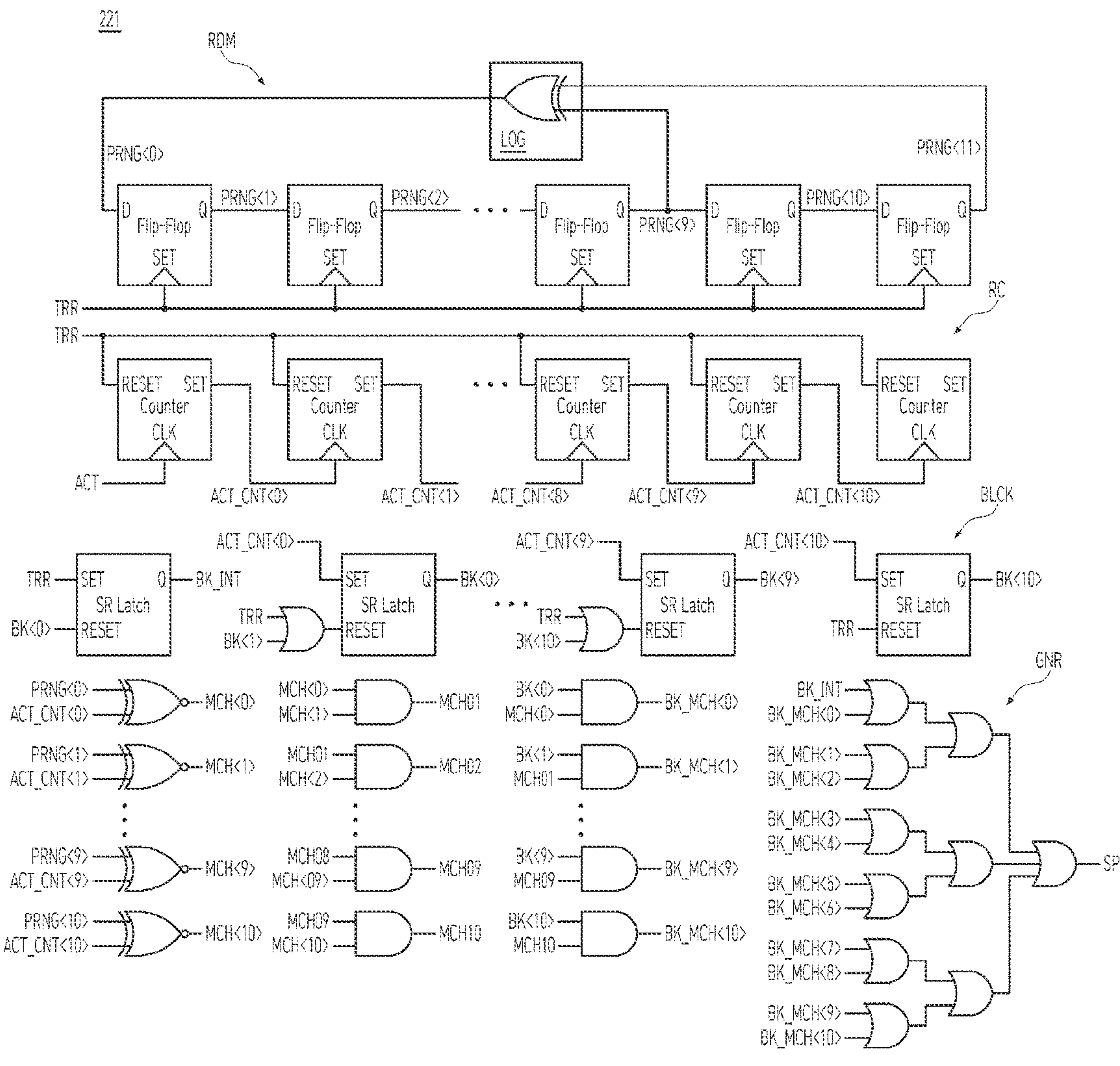
FIG. 10 is a circuit diagram illustrating a sampling controller illustrated in FIG. 9.

FIG. 10 is a circuit diagram illustrating the sampling controller 221 illustrated in FIG. 9.

Referring to FIG. 10, the sampling controller 221 may include a random number generator RDM, a random number counter RC, an active counter BLCK, and a logic controller GNR.

The random number generator RDM may generate a control signal PRNG, which corresponds to a random number, on the basis of the target refresh signal TRR. The control signal PRNG may include a plurality of bits PRNG<0:11>. For example, the random number generator RDM may include a plurality of flip-flops and an exclusive OR gate LOG. Since the random number generator RDM is already widely known to those skilled in the art, a detailed description thereof is omitted.

The random number counter RC may generate a count signal ACT_CNT<0:10> on the basis of the active signal ACT. The random number counter RC may be initialized based on the target refresh signal TRR.

The active counter BLCK may generate a block signal BK<0:10> on the basis of the target refresh signal TRR and the count signal ACT_CNT<0:10>. For example, the active counter BLCK may generate the block signal BK<0:10> corresponding to one of periods classified according to the number of times that the active signal ACT is inputted.

The logic controller GNR may generate the sampling signal SP on the basis of the control signal PRNG and the count signal ACT_CNT<0:10>. The logic controller GNR may activate the sampling signal SP when the random number indicated by the plurality of bits PRNG<0:11> included in the control signal PRNG coincides with a count value indicated by the count signal ACT_CNT<0:10>. For example, the logic controller GNR may include a plurality of exclusive OR gates, a plurality of AND gates, and a plurality of OR gates.

Figure 11:
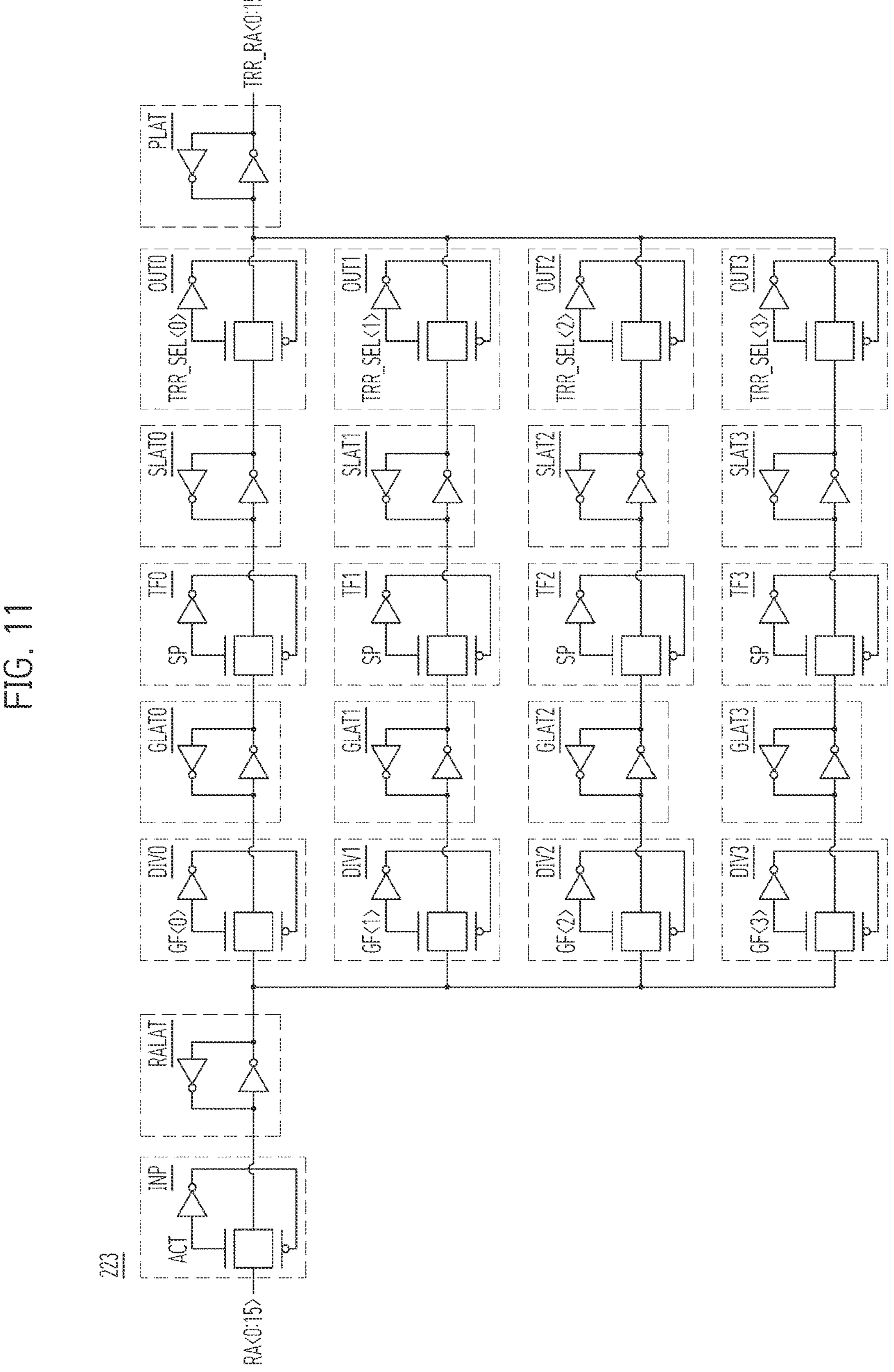
FIG. 11 is a circuit diagram illustrating a sampler illustrated in FIG. 9.

FIG. 11 is a circuit diagram illustrating the sampler 223 illustrated in FIG. 9.

Referring to FIG. 11, the sampler 223 may include an input unit INP, a first latch unit RALAT, first to fourth branch units DIV0 to DIV3, second to fifth latch units GLAT0 to GLAT3, first to fourth transmission units TF0 to TF3, sixth to ninth latch units SLAT0 to SLAT3, first to fourth output units OUT0 to OUT3, and a $10^{th}$ latch unit PLAT.

The input unit INP may receive the row address signal RA<0:15> on the basis of the active signal ACT. For example, the input unit INP may include an inverter and a transmission gate.

The first latch unit RALAT may latch the row address signal inputted through the input unit INP.

The first to fourth branch units DIV0 to DIV3 may selectively transmit the row address signal latched by the first latch unit RALAT to the second to fifth latch units GLAT0 to GLAT3 on the basis of the first to fourth group designation signals GF<0:3>. Since each of the first to fourth branch units DIV0 to DIV3 may be designed in the same manner as the input unit INP, detailed descriptions thereof are omitted.

The second to fifth latch units GLAT0 to GLAT3 may latch the address signal selectively transmitted from the first to fourth branch units DIV0 to DIV3 as one of first to fourth latch address signals.

The first to fourth transmission units TF0 to TF3 may transmit the first to fourth latch address signals, which are latched by the second to fifth latch units GLAT0 to GLAT3, to the sixth to ninth latch units SLAT0 to SLAT3 at a randomly determined point in time during the refresh period, on the basis of the sampling signal SP. Since each of the first to fourth transmission units TF0 to TF3 may be designed in the same manner as the input unit INP, detailed descriptions thereof are omitted.

The sixth to ninth latch units SLAT0 to SLAT3 may latch the first to fourth latch address signals transmitted from the first to fourth transmission units TF0 to TF3.

The first to fourth output units OUT0 to OUT3 may selectively output one of first to fourth address signals latched by the sixth to ninth latches SLAT0 to SLAT3 to the $10^{th}$ latch unit PLAT on the basis of the first to fourth group selection signals TRR_SEL<0:3>.

The $10^{th}$ latch unit PLAT may latch an address signal selectively outputted from the first to fourth output units OUT0 to OUT3 as the target address signal TRR_RA<0:15>.

Hereinafter, an operation of the memory device 10 in accordance with an embodiment of the present disclosure, which has the above-described configuration, is described with reference to FIGS. 12 and 13.

FIG. 12 is a diagram illustrating the operation of the memory device 10 in accordance with an embodiment of the present disclosure.

Referring to FIG. 12, the row address signal RA<0:15> may be inputted whenever the active signal ACT is activated. The count circuit 210 may count, in units of the address groups, the number of times that the row address signal RA<0:15> is inputted whenever the row address signal RA<0:15> is inputted. As a result of counting, for each address group, the number of times that the row address signal RA<0:15> is inputted, the count circuit 210 may select the target group having the largest counted number, i.e., the number of times that the row address signal RA<0:15> is inputted, among the counted numbers for the respective address groups. For example, when the result of counting, for each address group, the number of times that the row address signal RA<0:15> is inputted indicates that the counted number that the row address signal RA<0:15> is inputted to a first address group Group Filter 0 is the highest, the first address group Group Filter 0 may be selected as the target group. The count circuit 210 may select the target group, and then reset, i.e., initialize, the counted number that the row address signal RA<0:15> of the target group is inputted.

The sampling circuit 220 may randomly sample one of row address signals included in the target group among the plurality of address groups as the target address signal TRR_RA<0:15> on the basis of the sampling signal SP.

Figure 13:
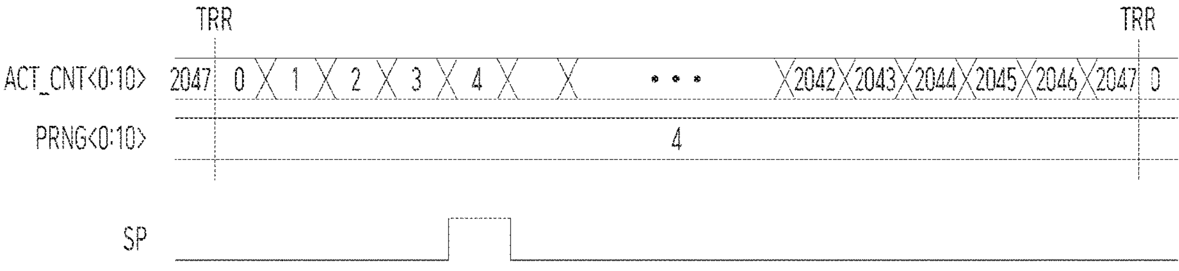

FIG. 13 is a timing diagram illustrating a process of generating the sampling signal SP.

Referring to FIG. 13, the refresh period may include a period from the point in time when the current target refresh signal TRR is activated to the point in time when the next target refresh signal TRR is activated. The refresh period may have 2048 ($2^{n-1}$) oscillation cycles. The target address signal TRR_RA<0:15> may be generated in a randomly selected sampling period among the 2048 oscillation cycles according to the sampling signal SP. The sampling signal SP may be activated during a period in which the random number indicated by the plurality of bits PRNG<0:11> included in the control signal PRNG coincides with the count value indicated by the count signal ACT_CNT<0:10>.

According to an embodiment of the present disclosure, an address counting method and a random sampling method may be optimally used, which makes it possible to obtain advantages of the address counting method and advantages of the random sampling method.

According to an embodiment of the present disclosure, as the number of input for each of a plurality of address signals is counted for each group when a row hammering phenomenon is detected, problems related to storage space may be solved, and as a target address signal is randomly sampled, it is possible to efficiently protect against row hammering attacks.

While the present disclosure has been illustrated and described with respect to specific embodiments, the disclosed embodiments are provided for the description, and not intended to be restrictive. Further, it is noted that the embodiments of the present disclosure may be achieved in various ways through substitution, change, and modification that fall within the scope of the following claims, as those skilled in the art will recognize in light of the present disclosure.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory device comprising:
- a count circuit configured to:
  - generate a plurality of group selection signals corresponding to a plurality of address groups by counting, in units of the address groups, a number of times that each of a plurality of address signals is inputted to the memory device, wherein each of the address groups corresponds to one or more address signals from the plurality of address signals; and
  - select a target group from the address groups, the target group corresponding to a greatest one of the numbers for the respective address groups; and
- a sampling circuit configured to randomly sample a target address signal from the target group based on the plurality of group selection signals and the plurality of address signals.

2. The memory device of claim 1, wherein the count circuit includes:
- a grouping circuit configured to generate a plurality of group designation signals, which correspond to the plurality of address groups, based on the plurality of address signals;
- a group count circuit configured to generate a plurality of group count signals, which correspond to the plurality of address groups, based on the plurality of group designation signals; and
- a group selection circuit configured to:
  - generate the plurality of group selection signals based on the plurality of group count signals and a target refresh signal, and
  - activate a group selection signal corresponding to the target group among the plurality of group selection signals.

3. The memory device of claim 2, wherein the grouping circuit includes:
- at least one encoder configured to generate at least one encoding signal based on the plurality of address signals; and
- a demultiplexer configured to generate the plurality of group designation signals, which correspond to the at least one encoding signal, based on an active signal.

4. The memory device of claim 2, wherein the group count circuit includes a plurality of group counters configured to count activation numbers of the respective group designation signals to generate the plurality of group count signals corresponding to the respective activation numbers.

5. The memory device of claim 4, wherein the plurality of group counters are initialized based on the plurality of group selection signals, respectively.

6. The memory device of claim 2, wherein the group selection circuit includes:

a discriminator configured to:

determine a size relationship between the plurality of address groups based on the plurality of group count signals, and generate a plurality of discrimination signals corresponding to a result of the determining;

a selector configured to generate a plurality of selection signals, one of which indicates the target group, based on the plurality of discrimination signals; and a generator configured to generate the plurality of group selection signals based on the plurality of selection signals and the target refresh signal.

7. The memory device of claim 6, wherein the discriminator includes a plurality of comparators each configured to:

compare the size relationship between two corresponding address groups among the plurality of address groups, and generate a corresponding discrimination signal of the plurality of discrimination signals according to a result of the comparing.

8. The memory device of claim 1, wherein the sampling circuit includes:

a sampling controller configured to generate a sampling signal, which is randomly activated in a refresh period, based on a target refresh signal and an active signal; and a sampler configured to randomly sample and output the target address signal based on the sampling signal, the plurality of group selection signals and the plurality of address signals.

9. The memory device of claim 8, wherein the sampling controller includes:

a random number generator configured to generate a control signal, which corresponds to a random number, based on the target refresh signal;

a random number counter configured to generate a count signal based on the active signal; and a logic controller configured to generate the sampling signal based on the control signal and the count signal.

10. The memory device of claim 8, wherein the sampler includes:

an input unit configured to receive, based on the active signal, an address signal currently inputted to the memory device among the plurality of address signals;

a first latch unit configured to latch the currently inputted address signal;

a plurality of branch units configured to selectively transmit, based on a plurality of group designation signals, the address signal latched by the first latch unit;

a plurality of second latch units configured to selectively latch the address signal transmitted from the plurality of branch units;

a plurality of transmission units configured to transmit, based on the sampling signal, the plurality of address signals latched by the plurality of second latch units;

a plurality of third latch units configured to latch the plurality of address signals transmitted from the plurality of transmission units;

an output unit configured to select, based on the plurality of group selection signals, one of the plurality of address signals latched by the plurality of second latch units; and a fourth latch unit configured to latch the address signal outputted from the output unit to output the target address signal.

11. A memory device comprising:

a grouping circuit configured to generate a plurality of group designation signals, which correspond to a plurality of address groups, based on a plurality of address signals, wherein each of the address groups corresponds to one or more address signals from the plurality of address signals;

a group count circuit configured to generate a plurality of group count signals, which correspond to the plurality of address groups, based on the plurality of group designation signals;

a group selection circuit configured to:

generate a plurality of group selection signals based on the plurality of group count signals and a target refresh signal, and activate a group selection signal corresponding to a target group among the plurality of group selection signals; and a sampling circuit configured to randomly sample a target address signal from the target group based on the plurality of group selection signals and the plurality of address signals.

12. The memory device of claim 11, wherein the grouping circuit includes:

at least one encoder configured to generate at least one encoding signal based on the plurality of address signals; and a demultiplexer configured to generate the plurality of group designation signals, which correspond to the at least one encoding signal, based on an active signal.

13. The memory device of claim 11, wherein the group count circuit includes a plurality of group counters configured to count activation numbers of the respective group designation signals to generate the plurality of group count signals corresponding to the respective activation numbers.

14. The memory device of claim 13, wherein the plurality of group counters are initialized based on the plurality of group selection signals, respectively.

15. The memory device of claim 11, wherein the group selection circuit includes:

a discriminator configured to:

determine a size relationship between the plurality of address groups based on the plurality of group count signals, and generate a plurality of discrimination signals corresponding to a result of the determining;

a selector configured to generate a plurality of selection signals, one of which indicates a target group corresponding to a greatest one of numbers of the respective address groups, based on the plurality of discrimination signals; and a generator configured to generate the plurality of group selection signals based on the plurality of selection signals and the target refresh signal, and wherein each of the numbers is a number of times that the address signals of a corresponding address group of the address groups are inputted to the memory device.

16. The memory device of claim 15, wherein the discriminator includes a plurality of comparators each configured to:

compare the size relationship between two corresponding address groups among the plurality of address groups, and generate a corresponding discrimination signal of the plurality of discrimination signals according to a result of the comparing.

17. A memory device comprising:

a count circuit configured to:

generate a plurality of group selection signals corresponding to a plurality of address groups by counting, in units of the address groups, a number of times that each of a plurality of address signals is inputted to the memory device, wherein each of the address groups corresponds to one or more address signals from the plurality of address signals, and select a target group from the address groups, the target group corresponding to a greatest one of the numbers for the respective address groups;

a sampling controller configured to generate a sampling signal, which is randomly activated in a refresh period, based on a target refresh signal and an active signal; and a sampler configured to randomly output, based on the sampling signal, the plurality of group selection signals and the plurality of address signals, a target address signal among the address signals included in the target group.

18. The memory device of claim 17, wherein the sampling controller includes:

a random number generator configured to generate a control signal, which corresponds to a random number, based on the target refresh signal;

a random number counter configured to generate a count signal based on the active signal; and a logic controller configured to generate the sampling signal based on the control signal and the count signal.

19. The memory device of claim 17, wherein the sampler includes:

an input unit configured to receive, based on the active signal, an address signal currently inputted to the memory device among the plurality of address signals;

a first latch unit configured to latch the currently inputted address signal;

a plurality of branch units configured to selectively transmit, based on a plurality of group designation signals, the address signal latched by the first latch unit;

a plurality of second latch units configured to selectively latch the address signal transmitted from the plurality of branch units;

a plurality of transmission units configured to transmit, based on the sampling signal, the plurality of address signals latched by the plurality of second latch units;

a plurality of third latch units configured to latch the plurality of address signals transmitted from the plurality of transmission units;

a plurality of output units configured to selectively output, based on the plurality of group selection signals, one of the plurality of address signals latched by the plurality of second latch units; and a fourth latch unit configured to latch the address signal selectively outputted from the plurality of output units to output the target address signal.

* * * * *